Oct. 30, 1951 D. B. CLARK Re. 23,424

POWER RECTIFIER TUBE

Original Filed March 14, 1947

INVENTOR.
DUDLEY B. CLARK
BY Albert R. Gobrick
ATTORNEY

Reissued Oct. 30, 1951

Re. 23,424

UNITED STATES PATENT OFFICE 23,424

POWER RECTIFIER TUBE

Dudley B. Clark, Palm Springs, Calif.

Original No. 2,468,037, dated April 26, 1949, Serial No. 734,712, March 14, 1947. Application for reissue August 9, 1951, Serial No. 241,138

6 Claims. (Cl. 313—169)

Matter enclosed in heavy brackets [ ] appears in the original patent but forms no part of this reissue specification; matter printed in italics indicates the additions made by reissue.

The present invention relates to a power rectifier tube of the mercury vapor type.

One of the objects of the present invention is to provide a power rectifier tube of the type referred to in which the anode may be located substantially closer to the cathode than in previous known types of mercury vapor rectifiers, thereby reducing the voltage drop through the tube.

It is also an object of the invention to provide a mercury vapor power rectifier in which a wide range of number of anodes may be utilized without the danger of reverse firing or shorting between the anodes.

Another object of the present invention is to provide a method of and a device for starting a power rectifier tube of the type mentioned in which the starting element may at all times be spaced from the cathode, and which will provide positive starting with a relatively low voltage impressed on the starter.

Still another object of the invention is to provide a power rectifier tube in which the anodes are shielded from one another to prevent short-circuiting thereof.

A further object of the invention is to provide a novel form of shield for insulating the anodes of a power rectifier tube.

Other objects and advantages of the invention will be apparent from the following description of preferred forms of embodiments of the invention, reference being made to the accompanying drawings wherein.

In the usual mercury vapor rectifier tubes, the cathode consists of a pool of mercury, and in order to ionize the mercury sufficiently to start a flow of current between the anode and cathode, a starter element is dipped into the mercury and then withdrawn while a potential is maintained between the element and cathode. This draws an arc causing the ionization desired. The type of tube has limitations in its use due to the liquid character of the cathode and also the tube is not as efficient as it could be in that the starter mechanism is more or less complicated and the anodes must be spaced sufficiently from the cathode to prevent splashing of mercury thereon.

In my co-pending application Serial No. 683,808, filed July 16, 1946, now Patent No. 2,528,033, issued October 10, 1950, I have shown and claimed a mercury vapor rectifier having a porous cathode member in which the mercury of the rectifier is contained so that the mercury will not slop or surge when the rectifier is tilted. In the present application I have shown another form of cathode which retains the mercury to prevent splashing or slopping, and which also presents a rough or irregular surface whereby ionization of the mercury to start the rectifier can be accomplished by a starter element having a sharp point located remote from the cathode. The structure of the rectifier eliminates the smooth surface of the mercury whereby points are provided for the concentration of the starting potential. Thus, starting can be accomplished by a relatively low voltage and without relative movement between the starter element and cathode.

Figure 1:
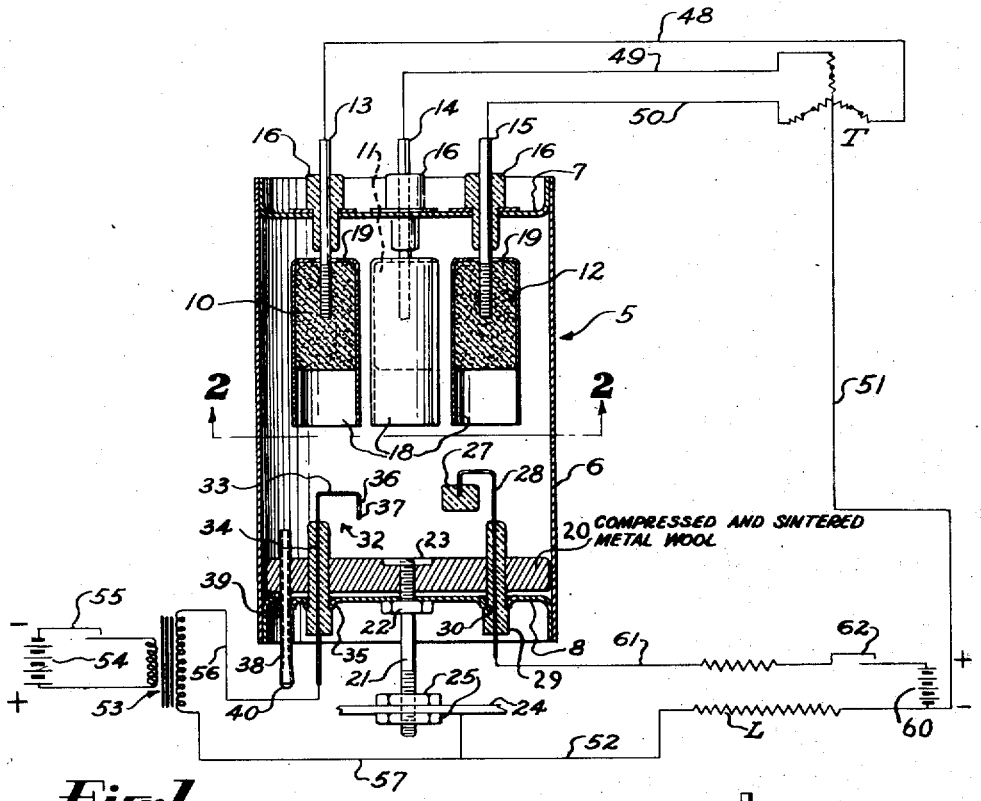
Fig. 1 is a view in section taken on line 1—1 of Fig. 2, of a multiple anode power rectifier tube embodying my invention, which tube is shown connected in a power circuit by wiring diagram.

Referring to the drawings, I have shown a rectifier tube indicated generally at 5 which embodies my invention. The tube includes a stainless steel cylindrical member 6 closed at the top by a wall 7 and at the bottom by a wall 8. These walls may be welded or silver soldered to the cylinder 6 for forming a gastight seal. In the form of invention shown, three graphite anodes 10, 11 and 12 are suspended into the tube 6 from the wall 7, although more or less anodes could be employed if desired. These anodes are connected to conductor rods 13, 14 and 15, respectively, which rods are each embedded in an [insulated] *insulator* member 16, which may be formed of glass, and the insulator members are each bonded with the top wall 7 by a gastight joint. In the form of the invention shown in Fig. 1, each of the anodes is provided with a shield 18, which shields are preferably formed of steatite, or a similar ceramic material, which are open at the bottom and have a partially closed upper wall 19.

A circular porous metal cathode 20 is disposed on the bottom wall 8, and this cathode is preferably formed by compressing metal wool and then sintering this mass so that the body of the cathode will be firm and porous, and will be capable of holding liquid mercury therein by molecular attraction. For example, a typical cathode having a diameter of 5 inches and a thickness of ⅜ inch is formed by taking 10 ounces of steel wool and compressing it to the dimensions mentioned and while in the compressed condition passing an electric charge of 40 volts, 10,000 amps condenser discharge through the cathode from a condenser and transformer for sintering the metal fibres together. Other metals in wool form can be used, for example, stainless steel, copper and Phosphor bronze. It will be understood that other types of porous cathodes could be employed, for example, such as that described and claimed in my co-pending application mentioned hereinbefore.

A central opening is provided through the cathode for the reception of a rod 21 which extends upwardly through an opening in the wall 8 and through the cathode [36] *20*. The rod 21 is provided with a flange 22 which is sealingly attached to the bottom of wall 8, as by welding or silver soldering, and a nut 23 is threaded on the upper end of the rod to hold the cathode 20 in place. The lower end of rod 21 is extended through a suitable supporting bracket or terminal bar 24 and the rod is attached to the bracket by clamp nuts 25. The rod 21 forms an electrical conductor for the cathode 20 and it also serves to support the tube 5.

When a single phase current is rectified, it is desirable to provide an auxiliary anode to form a keep-alive circuit through the rectifier. Such an auxiliary anode is not necessary where the rectifier is a polyphase type, such as that shown, but to illustrate the construction for a single phase rectifier, I have shown an auxiliary graphite anode 27 supported on the bottom wall 8 of the tube 5 and this anode is supported by a conductor wire 28 which is embedded in a glass insulator 29 which extends upwardly through the wall 8 and cathode 20. The insulator [27] *29* is [scaled] *sealed* in an opening 30 in the wall 8 to form a gastight connection with the wall.

A starter device 32 is also supported by the bottom wall 8 and the starter 32 comprises wire 33 embedded in a glass insulator 34, which insulator extends upwardly through the wall 8 and cathode 20 and is sealed in an opening 35 in wall 8 by a gastight joint. The wire 33 may be formed of tungsten, and it has a downwardly projecting end portion 36 and the end portion has a sharp point 37 formed thereon. Preferably, the point is as sharp as that of the usual sewing needle. The spacing of the auxiliary anode 27 and the starter element 32 does not necessarily have to be in the relation shown in the drawings, but any convenient spacing may be used. For example, the starter wire could be in a recess above and at one side of the cathode and pointing parallel to the surface of the cathode.

A tube 38 extends upwardly through an opening 39 in the bottom wall 8 and the tube 38 is sealed in the opening 39 by a gastight joint. The tube 38 is utilized for evacuating the tube 6 and for introducing suitable gas into the tube since normally the tube 38 is closed by a plug 40.

When the tube 5 is assembled as described, the air is withdrawn through the tube 38 and the assembly is baked at 400° for two hours. After the tube has cooled, distilled mercury is then admitted thereto through the inlet 38 in sufficient quantity to saturate the porous cathode 20, but leaving no excess loose mercury in the tube. Also, a limited amount of xenon gas is admitted into the tube to assist in the starting of the tube. Preferably, the pressure within the tube will be approximately .030 mm. at 60° C. It will be apparent that the cathode will hold the mercury by molecular attraction to prevent splashing or running of the mercury when the tube is tipped or jarred, and yet mercury is readily available for vaporization. The surface of the cathode will be rough and irregular, relative to the surface of a free body of mercury.

It is to be understood that any suitable cooling system may be used with the tube, none being disclosed in the present drawings. For example, the tube may be cooled by passing either air or water in heat transfer [release] *relation* with the walls of the cylinder 6.

The tube 5 is shown connected with a three-phase transformer T to supply three-phase half-wave power to a load L. The anode 10 is connected with one winding of the secondary of the transformer T by a wire 48, anode 11 is connected to another of the transformer secondary windings by a wire 49, and anode 12 is connected to the third secondary windings of the transformer T by a wire 50. One side of the load L is connected to the secondary of the transformer T by a line 51 and the other side of the load is connected to cathode 20 through line 52, bracket 24 and rod 21.

The starter circuit includes a step-up transformer 53 having a primary connected with a battery 54 by a circuit including a switch 55. One side of the secondary of transformer 53 is connected to the wire 33 of the starter by a wire 56, and the opposite side of the secondary is connected to the cathode through wires 57, 52, bracket 24 and rod 21. The transformer 53 and the battery 54 are of such design and voltage that when switch 55 is closed a peak voltage of between 2000 and 3000 volts is impressed between the pointed end of wire 33 and the cathode 20 through 50,000 ohms resistance, the polarity at the point of the wire being positive. This causes a cathode spot to be developed and the tube started. This cathode spot will be induced by a cold emission of electrons from minute points on the cathode surface. I have found that the tube will also start successfully with the polarity of the cathode and starter reversed from that just stated, but at a higher potential. In a polyphase circuit, such as that disclosed, the arc between the anodes and the cathode will be maintained after the tube has once started, until the power supply is interrupted.

In the event that a single phase power current is rectified, the starter may be connected to a transformer similar to 54 and the primary of the transformer connected with a circuit that is in phase with the power circuit. A phase shifting network may be provided to delay the phase on the transformer so that the starter will fire at some time during each positive half cycle. In this event, the auxiliary anode 27 may be dispensed with.

If it is desirable to use the auxiliary anode, when there is a single phase power supply, to maintain ionization within the tube, the anode 27 is connected with the positive pole of a battery 60 through wires 28 and 61, and the negative pole of the battery is connected with the anode by wire 51. A switch 62 is provided in line 61 for controlling energization of the anode 27. As long as the switch 62 is maintained closed a voltage will be maintained on anode 27, keeping the cathode spot alive during the non-conducting half-wave of the single phase cycle. It is to be understood that when the auxiliary anode 27 is used, it will not be necessary to provide for the off cycle starting by the starter 32.

By utilizing the ceramic sleeves 18, the electrical paths between the anodes are increased so as to prevent flashbacks or shorting between the anodes. By using the cathode described, or a cathode falling within the purview of my copending application mentioned hereinbefore, the mercury is contained entirely within the pores thereof and jarring or tilting of the rectifier tube cannot cause the mercury to splash and hence the anodes can be placed relatively close to the cathode so that the efficiency of the rectifier tube is greatly increased due to the short path between the anodes and cathode.

Figure 3:
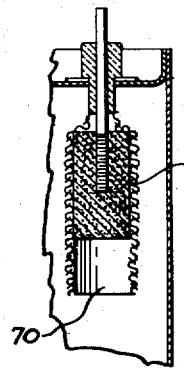
Fig. 3 is a fragmentary view of a power rectifier tube showing one anode for disclosing another form of the invention.
Figure 2:
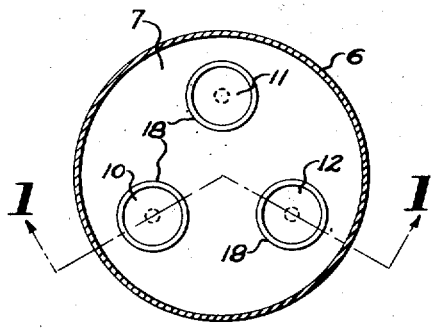
Fig. 2 is a view in section taken on line 2—2 of Fig. 1.

Referring to Fig. 3, I have shown another form of sleeve for the anodes, which sleeve is shown on an anode 112, which is similar to the anode 12. The sleeve comprises a tubular member 70 formed of cloth woven of glass fibers. The lower end of this sleeve is open and the [open] *upper* end may be tied about the conductor rod for the anode 112. This type of sleeve is quite inexpensive and will not break and at the same time it provides a high degree of insulation for the purpose desired.

It is essential that there be a sharp point at which the starting potential can be concentrated. I have found that by substituting a starter element having an end dull to the touch for the element having the needle point end, starting will not be accomplished at the voltages given for the pointed starter, and the voltage may be increased many fold without successful ignition. To practice my invention, therefore, using a pointed starter element, attention must be given to providing sufficient sharpness to the starter element so that the practical starting potentials will achieve the desired results.

I have also placed the starting element at various points remote from the cathode without affecting the efficiency thereof. For example, I have mounted the starter adjacent the top, at the sides and adjacent the bottom with successful results.

It is apparent that by my invention I have provided a power rectifier tube which is much more efficient that those heretofore used and which can be used in environments where there is likely to be considerable jarring and tilting of the tube without adversely affecting its operation. Also, a plurality of anodes may be used since the conditions generally causing shorting between the anodes is reduced. The starting tube device for the rectifier tube is extremely simple and will not easily be gotten out of order.

It will be understood that although I have described but two embodiments of the invention, it is to be understood that other forms of the invention might be adopted, all falling within the scope of the claims which follow.

I claim:

1. In a mercury vapor power rectifier comprising an enclosure, an anode; a porous cathode member saturated with mercury; and a starter element in said enclosure comprising a conductor member having a sharp pointed end.

2. In a mercury vapor power rectifier comprising an enclosure, an anode; a porous cathode member saturated with mercury; and a starter element in said enclosure comprising a conductor member having a pointed end comparable to the point of a sewing needle.

3. In a mercury vapor power rectifier comprising an enclosure, an anode; a cathode having a rough surface; and a starter element in the enclosure having a pointed end.

4. A mercury vapor power rectifier comprising an enclosure, an anode; a porous metallic cathode member saturated with mercury; and a starter element in said enclosure comprising a conductor member having a pointed end.

5. A mercury vapor power rectifier comprising an enclosure, an anode; a cathode comprising a mass of metal wool compressed and sintered into a relatively rigid form and holding mercury therein by molecular attraction; and a starter element in said enclosure comprising a conductor member having a pointed end.

6. A power rectifier tube including a cathode and a plurality of anodes suspended above the cathode; an enclosure for the cathode and anodes; and a sleeve consisting of glass cloth surrounding at least one of the [electrodes] *anodes,* said sleeve extending toward the cathode and below the lower surfaces of the anodes and being closed over the top of said one anode.

DUDLEY B. CLARK.

REFERENCES CITED

The following references are of record in the file of this patent or the original patent:

UNITED STATES PATENTS

| Number | Name | Date |
|---|---|---|
| 1,232,470 | Farnsworth | July 3, 1917 |
| 1,664,195 | Cremer | Mar. 27, 1928 |
| 2,354,031 | LaForge | July 18, 1944 |

FOREIGN PATENTS

| Number | Country | Date |
|---|---|---|
| 179,233 | Great Britain | May 4, 1922 |
| 263,076 | Germany | July 30, 1913 |
| 266,717 | Germany | Oct. 31, 1913 |